United States Patent [19]

McMillan et al.

[11] 4,265,446
[45] May 5, 1981

[54] SELF CONFIGURING CONTROLLER FOR THE STACKER AREA OF A DOCUMENT SORTING SYSTEM

[75] Inventors: Andrew H. McMillan, Wayne; John M. Chambors, Canton, both of Mich.

[73] Assignee: Burroughs Corporation, Detroit, Mich.

[21] Appl. No.: 54,290

[22] Filed: Jul. 2, 1979

[51] Int. Cl.³ .......................................... B65H 29/58
[52] U.S. Cl. .................................. 271/305; 271/279; 371/69
[58] Field of Search ............... 271/305, 298, 279, 288, 271/289, 290; 371/69

[56] References Cited

U.S. PATENT DOCUMENTS

| | | | |
|---|---|---|---|
| 3,252,139 | 5/1966 | Moore | 371/69 |
| 3,897,887 | 8/1975 | Goldberg | 222/26 |
| 4,124,121 | 11/1978 | Sung et al. | 271/305 X |

Primary Examiner—Bruce H. Stoner, Jr.
Attorney, Agent, or Firm—Charles E. Quarton; Kenneth J. Cooper; K. R. Peterson

[57] ABSTRACT

A self configuring track controller for a diverter gate motor in a stacker area of a document sorting system having pockets in which documents are selectively directed includes identical devices for governing each diverter gate motor in the stacker area. Integral with each track controller is a data line using binary, serial signals to teach each track controller its sequential position in the stacker area relative to other track controllers.

3 Claims, 4 Drawing Figures

N = TRACK CONTROLLER NUMBER IN THE DOCUMENT - SORTING SYSTEM

DOCUMENT SORTING SYSTEM.

TRACK CONTROLLER ORGANIZATION.

POSITION INFORMATION.

TRACK CONTROLLER LOGIC CARD.

N = TRACK CONTROLLER NUMBER IN THE
DOCUMENT - SORTING SYSTEM

SELF CONFIGURING CONTROLLER FOR THE STACKER AREA OF A DOCUMENT SORTING SYSTEM

BACKGROUND OF THE INVENTION

1. Field of the Invention

This invention relates to a self configuring track controller for a diverter gate motor in a stacker area of a document sorting system.

2. Description of the Prior Art

In the past, track controllers for document sorting systems have possessed the limitation of requiring hardware individualization so that each track controller would "know" its sequential position in the system. This limitation complicated controller manufacture since the circuitry of the controller depended upon its position in the sorting system. Alternatively, prior controllers would be mass-produced but then individualized to their system position through wired connections performed at the site of operation. The customizing of the controller for its position in the document sorting system increased controller complexity and required time, personnel, and money in both the initial installation and subsequent maintenance of the system.

Recently, a patent to Sung, et al entitled, Document Sorting System Having Interchangeable Pocket Modules, U.S. Pat. No. 4,124,121, issued Nov. 7, 1978, disclosed a system which utilized a six bit binary code to identify the position of identical, interchangeable modules in a document sorting system. The first four bits of the binary code functioned as the module address while the remaining two bits indicated the module's pocket designated to receive a sorted document. Each module contained circuitry which incremented by one the four bit binary module address code and transmitted that value to the next downstream module. As a result, uniquely wired modules were no longer required.

The Sung, et al patent differs from the present invention in that the applicants' device deals only with the individual track controller for a diverter gate motor within each module. The track controller is responsive to a logic card identical with the logic cards of track controllers throughout the document sorting system. Unlike the Sung, et al patent, the applicants' invention does not deal here with controls or codes for the pockets in each module. Rather than relying on a four bit binary code for track controller position information, a number of binary, serial transitions of voltage levels are transmitted on a single data line from an upstream track controller to the next downstream track controller. The number of voltage transitions, incremented by one by each successive downstream track controller, relates to the sequential position of the track controller in the document sorting system. Additionally, each downstream track controller receives its position information twice to verify that the initially transmitted position information was proper. The Sung, et al patent disclosed no method of self-checking the correctness of module addresses.

SUMMARY OF THE INVENTION

A self configuring track controller for a diverter gate motor in a stacker area of a document sorting system having pockets in which documents are selectively directed includes a mass-reproduceable logic card for governing each diverter gate motor in the stacker area. To teach each track controller its sequential position in the stacker area relative to other track controllers, binary, serial signals are transmitted on a data line to each downstream track controller. These binary, serial signals, in the form of voltage level transitions, are transmitted to the track controller twice so that the correctness of the track controller position information may be verified. A memory in the track controller stores the first transmission of the position information and a comparator indicates the correspondence of the stored information with the second received transmission of track controller position information. If the two transmissions of position information fail to correspond, the track controller is disabled.

DETAILED DESCRIPTION

Figure 1:
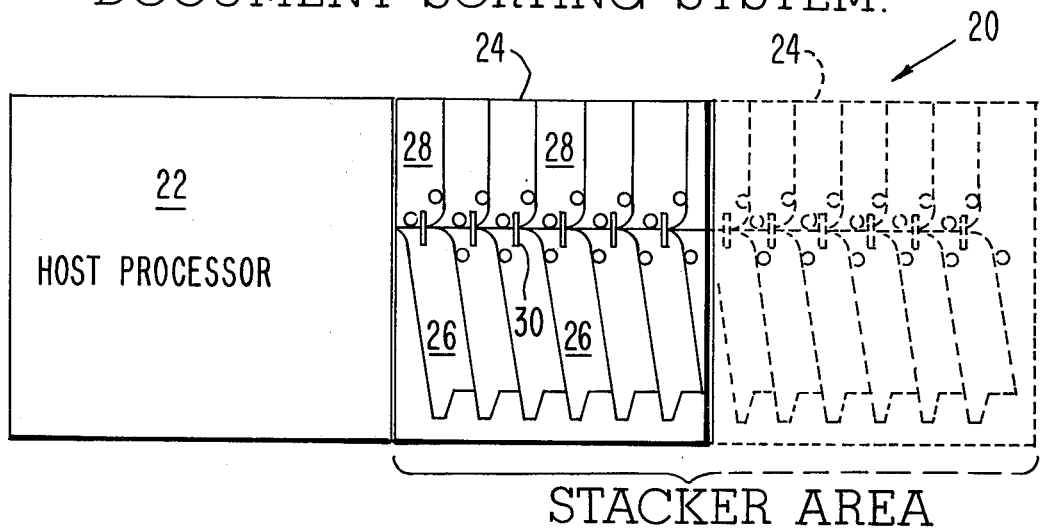
FIG. 1 depicts a document sorting system having a host processor and a stacker area.

To selectively sort documents, a document sorting system 20 (FIG. 1) has a host processor 22 and a number of stacker modules 24. Each stacker module sorts incoming documents into sets of front and rear pockets, 26 and 28 respectively, with a pivotal diverter gate 30. Identical track controllers 32 (FIG. 2) have an identical logic card (FIG. 3) which includes a microcontroller 34 (8035, manufactured by Intel Corporation, 3065 Bowers Avenue, Santa Clara, Calif., 95051) for receiving from host processor 22 (FIG. 1) a pocket address 36 (FIG. 3) in pocket address register 38 (74LS174, manufactured by Texas Instruments Incorporated, P.O. Box 5012, Dallas, Tex., 75222). In response to pocket address 36, microcontroller 34 selects the front, rear, and center positions of each diverter gate 30 (FIG. 1) with positioning outputs 40 (FIG. 3) from motor register 42 (74LS174, manufactured by Texas Instruments Incorporated, P.O. Box 5012, Dallas, Tex. 75222).

A document sorting system 20 (FIG. 1) having more than one diverter gate 30 must have the ability to select a particular track controller 32 (FIG. 2) to direct documents to their appropriate pockets 26 and 28 (FIG. 1). Therefore, these track controllers must know their sequential positions in the document sorting system 20. The approach of prior art devices was to uniquely wire each track controller for its sequential position in the sorting system. However, this scheme resulted in extra labor and material costs which are eliminated by the present invention.

Figure 3:
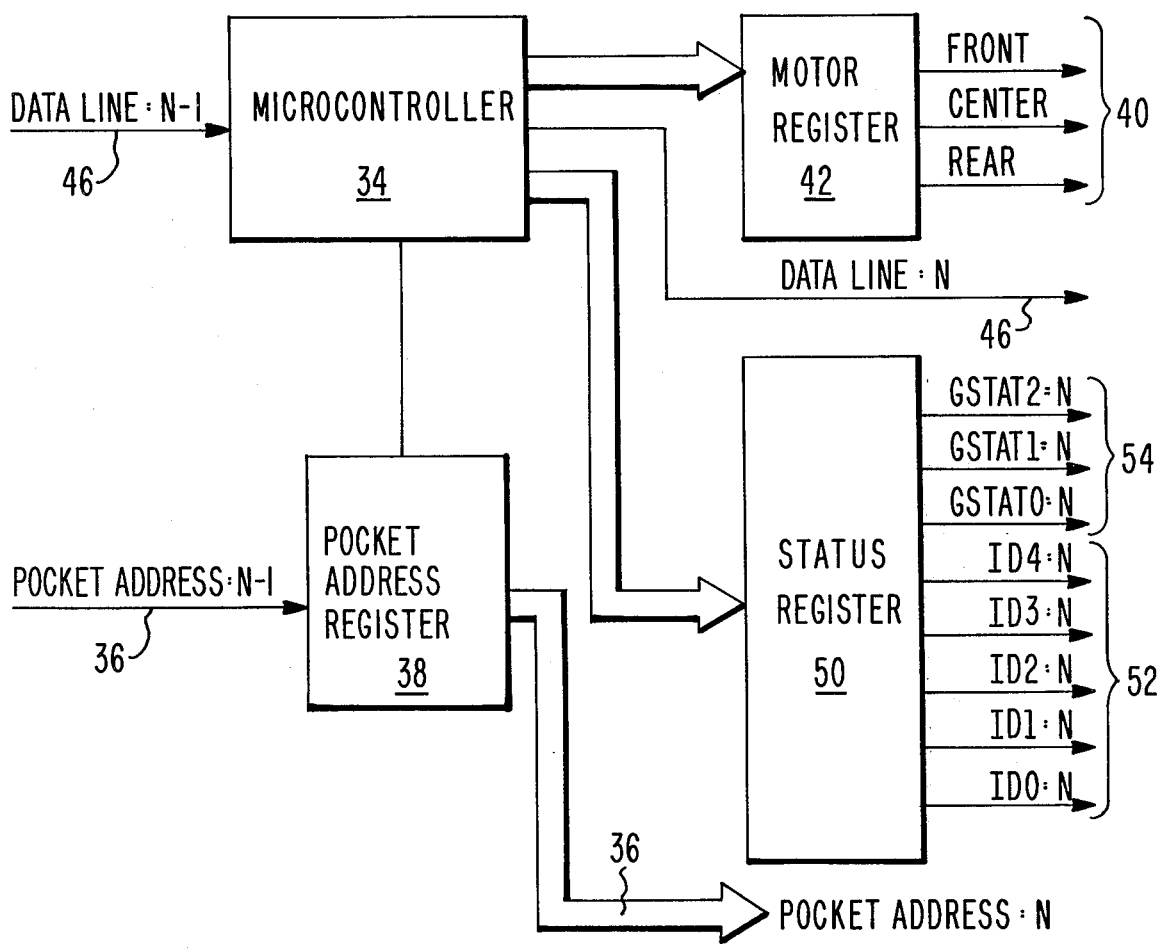
FIG. 3 is a block diagram representation of a track controller logic card.

In the invention, each track controller 32 is composed of an identical, mass-reproduceable logic card (FIG. 3). The logic card accepts and deciphers coded track controller position information in the form of one millisecond binary, serial voltage transitions 44 (FIG. 4) to identify the sequential position of the logic card's associated track controller 32 in a document sorting system 20 (FIG. 1). The interchangeability of the logic cards (FIG. 3) facilitates error detection and elimination since a suspected faulty card may be simply tested and corrected by removal and replacement.

The first track controller 32 (FIG. 2) in a document sorting system 20 receives position information on data line 46 from host processor 22. To indicate the first position, the first track controller will receive a zero output from host processor 22 while downstream track controllers 32 will sense a constant high signal corresponding to a binary one voltage level (typically five volts). Track controller number two will receive information corresponding to position number two by track controller number one incrementing by one the number of binary, serial voltage transitions 44 (FIG. 4) sent along data line 46 (FIG. 3). In turn, track controller number two increments by one the number of received voltage transitions 44 (FIG. 4) and transmits the information to track controller number three.

Figure 4:
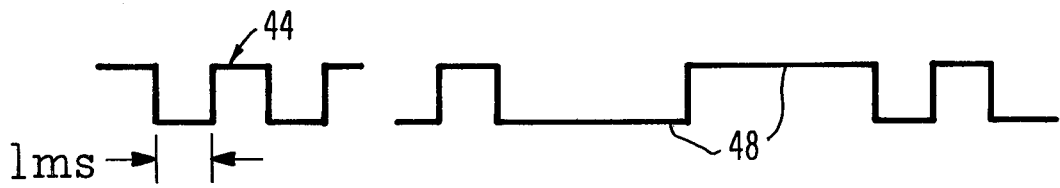
FIG. 4 is a diagram of binary, serial voltage transitions used to transmit track controller position information.

The microcontroller 34 (FIG. 3) for each track controller 32 counts and stores only one millisecond voltage transitions 44 (FIG. 4). The count is initiated when, after a given logic level has remained on data line 46 (FIG. 3) longer than five milliseconds, the logic level makes a transition from one to zero either by originally being at level one and dropping to zero or by jumping from zero to one and back to zero. This transition, following the delay 48 (FIG. 4) of one millisecond pulses, indicates to the microcontrollers 34 (FIG. 3) that track controller position information in binary, serial signals of one millisecond duration 44 (FIG. 4) is upcoming. Likewise, the onset of a delay 48 of one millisecond pulses indicates the conclusion of position information transmission.

Subsequent to the initiating voltage transition, the microcontroller 34 (FIG. 3) counts the number of one millisecond transitions 44 (FIG. 4) before the next pulse delay 48. That counted number corresponds to the position of the microcontroller's track controller 32 (FIG. 2) in document sorting system 20.

Figure 2:
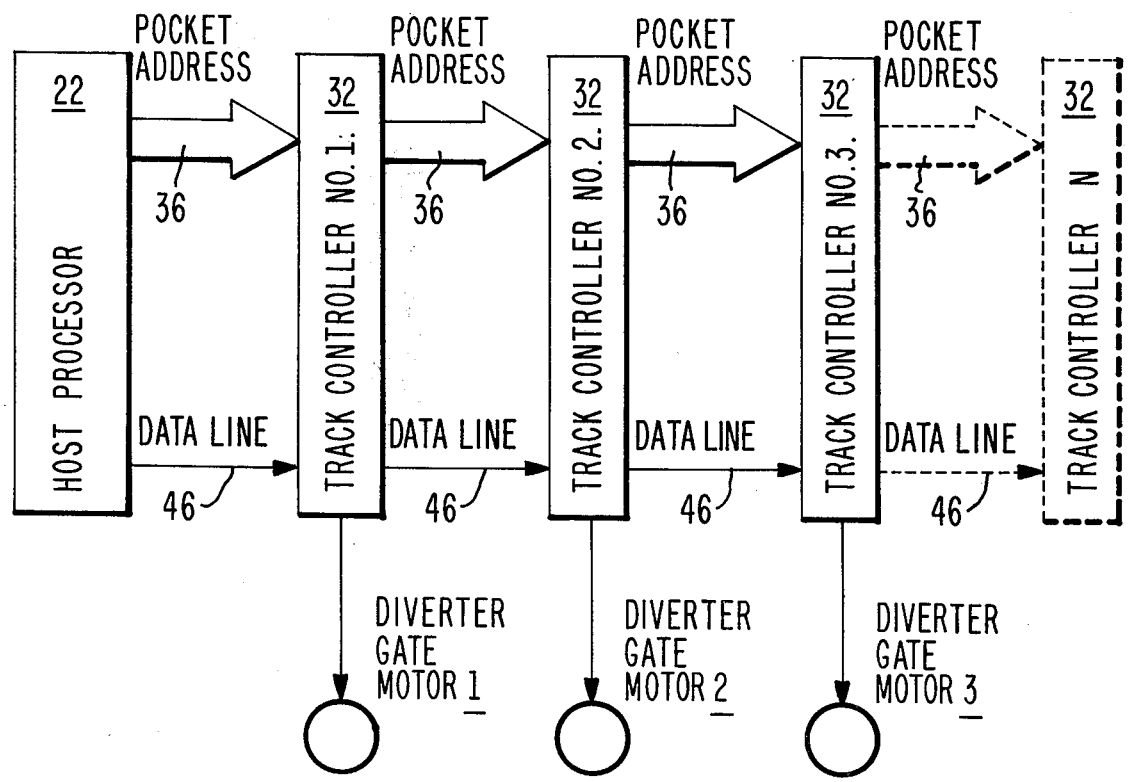
FIG. 2 is a block diagram representation of track controllers in a document sorting system.

To verify the correctness of the transmitted track controller position information, the originally sent series of voltage transitions 44 (FIG. 4) is stored in microcontroller 34 (FIG. 3). After the predescribed delay 48 (FIG. 4) of one millisecond pulses ceases and the initiating pulse from one to zero is sensed, the immediately following series of binary signals 44 is compared in microcontroller 34 (FIG. 3) with the stored number of pulses. In effect, track controller position information is transmitted twice to each track controller 32 (FIG. 2).

If the number of voltage transitions 44 (FIG. 4) in the two transmissions is equal, the microcontroller 34 (FIG. 3) receiving these pulses will increment by one the number of binary, serial voltage transitions 44 (FIG. 4) and transmit them to the next downstream track controller 32 (FIG. 2) along data line 46. In addition, the correctly received and compared track controller position information in microcontroller 34 (FIG. 3) will be translated by status register 50 (74LS273, manufactured by Texas Instruments Incorporated, P.O. Box 5012, Dallas, Tex., 75222) to a five bit identification code 52. This code allows a field engineer, performing tests on document sorting system 20 (FIG. 1), another method of verifying the track controller's proper reception of position information.

If the two sets of voltage transition signals 44 (FIG. 4) are not equal, microcontroller 34 (FIG. 3) will not increment by one the number of received, binary, serial voltage transitions 44. Instead, a signal will be generated by controller 34 to status register 50 and converted to a three bit binary code 54 on gate status outputs, GSTAT O:N through GSTAT 2:N. The binary GSTAT code 54 is sent back to host processor 22 (FIG. 2) to indicate a logic card (FIG. 3) malfunction. As a result, downstream track controllers 32 (FIG. 2) will not receive position information (FIG. 4) over their data line 46 and will remain nonresponsive to host processor 22 (FIG. 1) for sorting documents into pockets 26 and 28 until the fault is located and corrected.

What is claimed is:

1. In the stacker area of a document sorting system having a host processor generating a document destination code and a repeated track controller position code, a plurality of stacker modules where each module contains a plurality of pockets in which documents are sorted, and a plurality of diverter gates directing documents to appropriate pockets, a self configuring track controller for each diverter gate, each track controller comprising:

an identical and interchangeable logic card responsive to the document destination code and to the track controller position code, the logic card including:

means for receiving the document destination code indicating the pocket to which a document is to be sorted;

a microcontroller for receiving the track controller position code and for generating diverter gate movement commands, the track controller position code designating the sequential position of the track controller in the document sorting system by a number of voltage transitions;

a motor register, responsive to the diverter gate movement commands, for positioning the diverter gates;

means for translating the track controller position code to an identification service code for testing the logic card; and means, responsive to the microcontroller, for generating a status code to the host processor to indicate a malfunction and to cease continued track controller position code transmissions when the repeatedly generated track controller position codes differ.

2. The invention of claim 1, wherein the microcontroller further comprises:

means for counting the number of voltage transitions in the track controller position code;

means for storing the counted number of voltage transitions;

means for comparing the repeated track controller position code to verify the correctness of the originally transmitted code; and means, responsive to the means for comparing, for altering the number of voltage transitions in the track controller position code when the repeated track controller position code is identical, the altered number of voltage transitions being transmitted to a logic card for a track controller in a downstream stacker module, the altered track controller position code indicating the sequential position of the downstream track controller in the document sorting system.

3. The invention of claim 1, wherein the plurality of stacker modules in the document sorting system comprises a plurality of front and rear pockets into which documents are sorted by diverter gates.

* * * * *